United States Patent
Stover

(10) Patent No.: US 6,551,709 B1
(45) Date of Patent: *Apr. 22, 2003

(54) METHODS OF INHIBITING CATALYZED OXIDATION OF CARBON-CARBON COMPOSITES USING PHOSPHORIC ACID, A ZINC SALT, AND AN ALUMINUM SALT AND ARTICLES MADE THEREFROM

(75) Inventor: Edward Roy Stover, Akron, OH (US)

(73) Assignee: Goodrich Corporation, Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/215,446

(22) Filed: Mar. 18, 1994

(51) Int. Cl.$^7$ .................................................. B32B 9/00
(52) U.S. Cl. ...................... 428/408; 428/448; 428/220; 428/368; 428/699; 428/646; 428/704
(58) Field of Search ..................... 428/698, 323, 428/408, 699, 908.8, 448, 220, 368, 689, 704, 646, 457, 212; 427/229, 350, 96, 343, 380, 249, 255.4, 244, 374.1, 419.7, 430.1, 113, 376.1

(56) References Cited

U.S. PATENT DOCUMENTS

| | | | |
|---|---|---|---|
| 2,685,539 A | 8/1954 | Woodburn et al. | 117/169 |
| 2,685,540 A | 8/1954 | Woodburn et al. | 117/169 |
| 2,685,541 A | 8/1954 | Woodburn et al. | 117/169 |

(List continued on next page.)

FOREIGN PATENT DOCUMENTS

| | | |
|---|---|---|
| DE | 1179851 | 4/1960 |
| EP | 606851 | 7/1994 |
| WO | 8807506 | 10/1988 |

OTHER PUBLICATIONS

102: 30849a, Manufacture of high temperature Oxidation–Resistant Carbon Materials, Mitsubishi Pencil Co., Ltd., Aug. 14, 1984, Chemical Abstract vol. 102, 1985.
109: 97800r, Oxidation–Resistant Carbon Materials, Kawarasaki, Yukio, Jan. 7, 1988. Chemical Abstrast vol. 109, 1988.
94: 144319Z, Prevention of Oxidation of Carbon Carbon–Graphite Graphite–Coated, and Graphite–Grog Products. Gierek, Adam, Jan. 31, 1980. Chemical Abstract vol. 94, 1981.
108: 191634r, Carbonaceous Friction Materials with Excellent Oxidation Resistance, Komatsu, Yasukado, Jan. 30, 1988, Chemical Abstract vol. 108, 1988.
84: 19854n, Oxidation–Resistant Carbonaceous Materials, Shimizu, Kenichi, May 8, 1975. Chemical Abstract vol. 84, 1976.

(List continued on next page.)

Primary Examiner—Merrick Dixon
(74) Attorney, Agent, or Firm—Renner, Otto, Boisselle & Sklar, LLP

(57) ABSTRACT

This invention relates to a method of inhibiting catalyzed oxidation of carbon-carbon composites involving the steps of treating a carbon-carbon composite having pores with a liquid composition, preferably an aqueous solution, containing (a) phosphoric acid, (b) a zinc salt, and (c) an aluminum salt and heating the treated carbon-carbon composite to a temperature sufficient to form deposits within the pores. In one aspect, the deposit comprises a dispersion of aluminum-rich phosphate in zinc-rich phosphate. This solution may be used in combination with a silicon carbide barrier coating, applied by either painting or by CVD, to allow application at higher temperatures. The adherence of the barrier coating may be improved by preoxidizing the surface to increase porosity at the surface. Articles, including friction brakes, and the aqueous compositions are also part of this invention. The methods and articles show improved penetration and retention of the catalyzed oxidation inhibitors.

21 Claims, 1 Drawing Sheet

U.S. PATENT DOCUMENTS

| | | | |
|---|---|---|---|
| 2,685,542 A | | 8/1954 | Woodburn et al. .......... 117/169 |
| 2,867,545 A | | 1/1959 | Hammen et al. ........... 117/102 |
| 2,906,632 A | | 9/1959 | Nickerson ................... 106/56 |
| 3,029,167 A | | 4/1962 | Carlson et al. ............. 117/228 |
| 3,174,872 A | | 3/1965 | Fisher et al. .................. 106/56 |
| 3,206,327 A | | 9/1965 | Diefendorf ................. 117/121 |
| 3,342,627 A | | 9/1967 | Paxton et al. ............... 117/113 |
| 3,351,477 A | | 11/1967 | Wallouch ..................... 106/56 |
| 3,510,347 A | * | 5/1970 | Strater |
| 3,713,882 A | * | 1/1973 | DeBrunner et al. |
| 4,332,856 A | | 6/1982 | Hsu ........................... 428/408 |
| 4,439,491 A | * | 3/1984 | Wilson |
| 4,454,193 A | * | 6/1984 | Block |
| 4,548,957 A | | 10/1985 | Hucke ......................... 521/77 |
| 4,617,232 A | * | 10/1986 | Chandler et al. |
| 4,621,017 A | * | 11/1986 | Chandler et al. |
| 4,711,666 A | | 12/1987 | Chapman et al. ........ 106/14.12 |
| 4,837,073 A | * | 6/1989 | McAllister et al. |
| 4,865,646 A | | 9/1989 | Egberg .......................... 106/2 |
| 4,891,246 A | * | 1/1990 | McEwen et al. ............ 427/229 |
| 5,102,698 A | | 4/1992 | Cavalier et al. ......... 427/376.1 |
| 5,362,567 A | * | 11/1994 | Washburn et al. .......... 428/405 |
| 5,401,440 A | | 3/1995 | Stover et al. ............ 252/400.2 |

OTHER PUBLICATIONS

89: 29613a, Oxidation–Resistant Carbon Products, Nakajima, Hiroshi, Jan. 26, 1978. Chemical Abstract vol. 89, 1978.

F.K. Earp and M.W. Hill, Oxidation of Carbon and Graphite pp. 326–333.

The Catalyzed Gasification Reactions of Carbon, D.W. McKee Corporate Research & Development Center, General Electric Co., New York. Chemistry and Physics of Carbon, 1965 p. 1–117.

69–08178A, Protective Mechanism of Phosphorous–Containing Coatings Suvorov, S.A.; Chaikun, E.V.; Korobkin, S.L.; et al. Ogneupory, 1988, No. 9 pp. 24–7. Ceramics Abstracts.

Extended Abstracts and Program, American Carbon Society, Jul., 1983, Inhibition of Graphite Oxidation, D.W. McKee et al.

The Inhibition of Graphite Oxidation by Phosphorous Additives, D.W. McKee et al. May 17, 1983, Carbon vol. 22, No. 3, pp. 285–290.

Effect of Adsorbed Phosphorous Oxychloride on the Oxidation Behavior of Graphite, D.W. McKee, Mar. 1, 1972, Carbon vol. 10 pp. 491–497.

* cited by examiner

METHODS OF INHIBITING CATALYZED OXIDATION OF CARBON-CARBON COMPOSITES USING PHOSPHORIC ACID, A ZINC SALT, AND AN ALUMINUM SALT AND ARTICLES MADE THEREFROM

TECHNICAL FIELD OF THE INVENTION

This invention relates to a method and composition useful in inhibiting catalyzed oxidation of carbon-carbon composites.

BACKGROUND OF THE INVENTION

Many aircraft utilize a stack of carbon composite discs in brakes that can absorb large amounts of kinetic energy required to stop the aircraft during landing or in the event of a rejected take-off. During some of the stops, the carbon is heated to sufficiently high temperatures that surfaces exposed to air will oxidize. Carbon composites with thermal and mechanical properties required for specific brake designs have been prepared. However, these composites have had residual open porosities (typically 5% to 10%) which permit internal oxidation. The internal oxidation weakens material in and around the brake rotor lugs or stator slots. These areas transmit the torque during braking. One simple, low-cost method of minimizing loss of strength and structural integrity is application of phosphoric acid to non-wear surfaces of brake discs, followed by baking to 650° C. This method inhibits normal oxidation of carbon sufficiently for many applications, including aircraft brakes.

Similarly, carbon-carbon composites have been coated with barriers to prevent oxidation. The barriers include silicon based coatings, such as silicon carbide. The coatings however have cracks and porosity. These cracks and porosity are areas which may be subject to the above oxidation problems.

Some commercial transport brakes have suffered crushing in the lugs or stator slots. The damage has been associated with visible surface oxidation and oxidation enlargement of cracks around fibers or in the carbon-carbon carbon composite coating. The enlargement occurs at depths up to 0.5 inch beneath the exposed surfaces. Potassium or sodium has been identified in the severely oxidized regions. Alkali and alkaline earth elements are well known to catalyze carbon oxidation. Catalyzed oxidation is carbon oxidation that is accelerated by the presence of contaminating materials. These contaminating materials come into contact with the brake from cleaning and de-icing chemicals used on aircraft. Sodium can originate from salt deposits left from seawater or sea spray. These liquids, and other deicers or cleaners containing K or Na, can penetrate the porous carbon discs leaving catalytic deposits within the pores. When such contamination occurs, the rate of carbon loss by oxidation can be increased by one to two orders of magnitude. There is a need to provide protection against such catalyzed oxidation.

McKee points out that phosphates can deactivate catalytic impurities in carbon by converting them to inactive, stable phosphates (D. W. McKee, *Chemistry and Physics of Carbon* 16, P. I. Walker and P. A. Thrower eds., Marcel Dekker, 1981, p. 30.)

Woodburn and Lynch (U.S. Pat. No. 2,685,539) describe several ways of impregnating pores in carbon or graphite with aluminum phosphate. They specified compositions having a molar ratio of $Al_2O_3:P_2O_5$ between 0.2:1 and 0.8:1. Application methods included brushing, spraying or soaking in solutions, including $Al(H_2PO_4)_3$ dissolved in aqueous HCl.

U.S. Pat. No. 4,439,491, issued to Wilson, relates to carbon or graphite protected against oxidation by application of a solution comprising mono-ammonium phosphate, zinc orthophosphate, phosphoric acid, boric acid, cupric oxide, and wetting agent in water.

U.S. Pat. No. 4,837,073, issued to McAllister et al., relates to a barrier coating and penetrant providing oxidation protection for carbon-carbon materials. The method involves penetrating a barrier coating for carbon-carbon materials with an oxidation inhibitor.

It is desirable to have a simple, effective method and composition to inhibit catalyzed oxidation of carbon.

SUMMARY OF THE INVENTION

This invention relates to a method of inhibiting catalyzed oxidation of carbon-carbon composites having pores comprising the steps of treating a carbon-carbon composite with a liquid composition comprising (a) phosphoric acid, (b) a zinc salt, and (c) an aluminum salt and heating the treated carbon-carbon composite to a temperature sufficient to form deposits within the pores. In certain preferred embodiments the composition is a solution, preferably aqueous-based. This solution may be used in combination with a silicon carbide barrier coating, applied by either painting or by CVD, to allow application at higher temperatures. In one aspect, the deposit comprises a dispersion of aluminum-rich phosphate in zinc-rich phosphate. It is believed that the deposit acts as a scavenger to capture Na or K or other oxidation catalysts. Articles, including friction brakes, and the liquid compositions are also part of this invention. The methods and articles show improved penetration and retention of the catalyzed oxidation inhibitors.

BRIEF DESCRIPTION OF THE DRAWINGS

FIG. 2a is an energy dispersive X-ray spectrum of dark inclusions in the microstructure of FIG. 1a; and FIG. 2b is an energy dispersive X-ray spectrum of the light matrix in the microstructure of FIG. 1a.

DESCRIPTION OF THE PREFERRED EMBODIMENTS

Figure 1A:
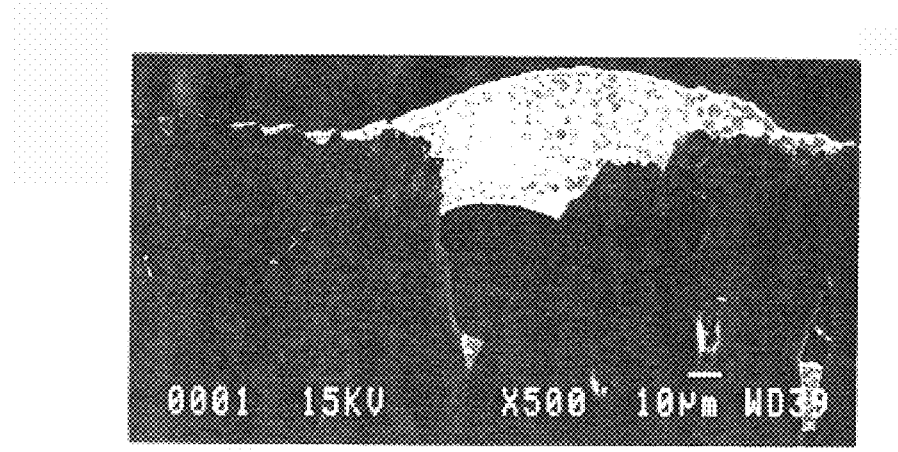
FIG. 1a is a microstructure cross-section of a carbon-carbon composite inhibited with the compositions of the present invention at a magnification of 500×.

As used in the specification and claims, the term "retention" refers to preventing the migration of the liquid impregnant from the pores of the carbon-carbon deposit to the surface thereof upon heating. This invention is particularly useful for aircraft brakes which operate at temperatures up to about 700° C. during normal service, or, where a barrier coating is applied, up to about 900° C. It is in the lower temperature range, e.g. above about 400° C. to about 600° C., where commercial aircraft brakes operate most of the time, that the effect of catalytic oxidation is most severe in allowing more rapid degradation of a carbon body's strength by oxidation internally from air diffusing into the pores of the composite. Application of this invention provides a means for significantly extending the service life of carbons by preventing catalyst-accelerated, internal oxidation. In order to protect carbon from rapid oxidation by catalysis from Na, K, or other metals in contaminating liquids encountered during service, metal phosphate deposits should be distributed uniformly throughout the pores of the composite (e.g. with not more than 18 1 mm separation between deposits) to a depth sufficient to cover the range affected by $O_2$ diffusing in from exposed surfaces (~1 cm). The process described here has provided such deposits when the carbon is heated in service to the range 400° C. to 850° C. (but below ~1040° C.).

Carbon-carbon composites are generally prepared from carbon preform. Carbon preforms are made of carbon fibers, which may be formed from pre-oxidized acrylonitrile resin. In one embodiment, these fibers can be layered together to form a shape, such as a friction brake. The shape is heated and infiltrated with methane or another pyrolyzable carbon source to form the carbon-carbon composites. Carbon-carbon composites and methods of their manufacture are known to those in the art. In one embodiment, the carbon-carbon composite has a density from about 1.6 to about 1.9 g/cm$^3$. A carbon-carbon composite particularly useful as a friction material of an aircraft multi-disc brake has a density of about 1.75 g/cm$^3$.

In one embodiment, the carbon-carbon composites have a barrier coating. In one embodiment, the thickness of the barrier coating is generally from about 0.0005 to about 0.005, or from about 0.001 to about 0.003, or from about 0.001 to about 0.002 inches. Here, as well as elsewhere in the specification and claims, the range and ratio limits may be combined. In one embodiment, the barrier coating has continuous porosity. Examples of barrier coatings include silicon carbide, titanium carbide, silicon oxycarbide, etc. These coatings may be applied to the carbon-carbon composites by any means known to those in the art. In one embodiment, the barrier coating may be applied by chemical vapor deposition (CVD), painting, or spraying. In one embodiment, the carbon-carbon composites have a silicon carbide based coating prepared by CVD with subsequent heat treatment (or cooling after deposition) that results in microcracks through which an inhibitor solution can penetrate. In another embodiment, the barrier coating is applied as a commercial paint, such as ZYP Coatings, Inc., Oak Ridge, Tenn., grade SC, which is baked to 650° C. or above, either before or after the pores of the carbon are penetrated by the inhibitor solution.

The carbon-carbon composites or the coated carbon-carbon composites are treated with a liquid composition, preferably an aqueous solution, comprising (a) phosphoric acid, (b) a zinc salt, and (c) an aluminum salt. The phosphoric acid (a) is generally present in an amount from about 5% up to about 35%, or from about 10% up to about 30%, or from about 12% up to about 25% by weight of the aqueous composition.

The zinc salt (b) may be any zinc salt capable of forming zinc phosphate upon heating. Examples of zinc salts include zinc halides, such as zinc chloride, zinc nitrate, zinc phosphate and mixtures thereof. In one embodiment, the zinc salt is $Zn_3(PO_4)_2.2H_2O$. The zinc salt (b) may be present in an amount from about 2% up to about 20%, or from about 5% up to about 18%, or from about 8% to about 14% by weight of the aqueous composition.

The aluminum salt (c) may be any aluminum salt capable of forming aluminum phosphate upon heating. Examples of aluminum salts include aluminum halides, such as aluminum chloride, aluminum nitrate, aluminum phosphate, and mixtures thereof. In one embodiment, the aluminum salt is added as a soluble aluminum phosphate, preferably mono-aluminum phosphate $(Al(H_2PO_4)_3)$. The aluminum salt (c) is generally present in an amount from about 10% up to about 50%, or from about 15% up to about 35%, or from about 20% up to about 30% by weight of the aqueous composition.

The aqueous composition may additionally contain (d) a compatible wetting agent. A compatible wetting agent is a material which does not separate from the aqueous composition before the aqueous composition is used. In one embodiment, the wetting agent is selected from the group consisting of polyols, alkoxylated monohydric alcohols, and mixtures thereof. The wetting agent (d) is present in an amount sufficient to improve the penetration and retention of the aqueous composition. The wetting agent (d) is typically present in an amount from about 0.3% up to about 3%, or from about 0.5% up to about 2%, or from about 0.75% up to about 1.5% by weight of the aqueous composition.

When the wetting agent (d) is a polyol, it generally contains two, three, or four hydroxyl groups, preferably two hydroxyl groups. In one embodiment, the polyol is alkoxylated. In another embodiment, the polyol is an acetylenic polyol. The acetylenic polyol may be branched. Examples of acetylenic polyols include dimethylhexynol, dimethyloctynediol, and tetramethyldecynediol. Acetylenic polyols are available commercially from Air Products & Chemicals, Inc. under the trademark SURFYNOL. An example of a useful acetylenic polyol is SURFYNOL 104.

The acetylenic polyol may also be alkoxylated. These materials are generally prepared by treating an acetylenic polyol with an epoxide, such as ethylene oxide, propylene oxide, etc. An example of a useful alkoxylated acetylenic polyol is SURFYNOL 440.

The wetting agent (d) may also be an alkoxylated monohydric alcohol. The alkoxylated monohydric alcohols are generally prepared by reacting a monohydric alcohol with an epoxide, such as those epoxides described above. In one embodiment, the alcohol contains from about 8 to about 24, or from about 10 up to about 18 carbon atoms. The alkoxylated monohydric alcohol may be an alkoxylated linear alcohol. An example of a useful alkoxylated alcohol is POLY-TERGENT SL-62 available commercially from Olin Corporation.

In one embodiment, the wetting agent is applied to the porous carbon-carbon composite without a protective barrier coating. However, it is preferably omitted when the solution is applied to a cracked or porous barrier coating.

In another embodiment, the aqueous composition contains less than 0.5%, or less than 0.1% by weight boron. In another embodiment, the aqueous mixture is free of boron. In another embodiment the aqueous composition contains less than 0.5%, or less than 0.1% by weight manganese. In another embodiment, the aqueous mixture is free of manganese. In another embodiment, the aqueous composition is free of hydrochloric acid. In one embodiment, the aqueous composition consists essentially of (a) phosphoric acid, (b) a zinc salt, (c) an aluminum salt, and optionally (d) a compatible wetting agent.

The invention also relates to a method of inhibiting catalyzed oxidation of carbon-carbon composites comprising the steps of treating a carbon-carbon composite with one or more of the above described aqueous compositions and heating the treated carbon-carbon composite to a temperature sufficient to form deposits in the pores of the composite. In one embodiment, the deposit comprises a dispersion of aluminum-rich phosphate in zinc-rich phosphate matrix. The treated carbon-carbon composites are generally heated to a temperature from about 640° C. to about 1000° C., from about 750° C. to about 900° C., or from about 800° C. up to 900° C. The heating step is usually accomplished in one to six hours. In one embodiment, the aqueous mixture is applied to non-wearing regions exposed to oxidation, such as the back faces of the end plates of a brake stack, the drive areas and inside diameter surfaces of the stators and lugs and outside diameter surfaces of the rotors in the brake stack. The mixture is prepared by first blending the phosphoric acid; zinc phosphate and monoaluminum phosphate components of the aqueous composition, heating gently to accomplish complete solution. In one embodiment, the wetting agent is then added and mixed ultrasonically. Typically the method occurs at atmospheric pressure. The aqueous mixture may be applied by any means known to those in the art, including painting, dipping, spraying, etc. The carbon parts may be given a heat treatment or warmed prior to application of the solution to aid penetration of the solution. The treated carbon parts are then baked in a nonoxidizing atmosphere (e.g. $N_2$) in a manner which optimizes the retention of the oxidation inhibitors in the pores. Such retention is improved by heating a load of brake discs to about 200° C. and holding for 1 hour before heating to a temperature in the range 650° C. to 840° C. at a rate which provides temperature uniformity within the load. The maximum temperature is held for a time sufficient to obtain that temperature throughout the load.

Figure 1B:
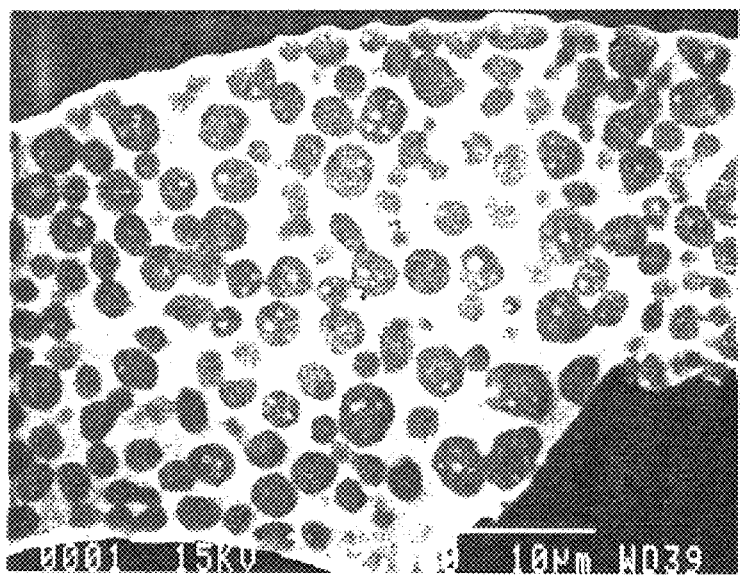
FIG. 1b is a portion of FIG. 1a at a magnification of 2000×.
Figure 2A:
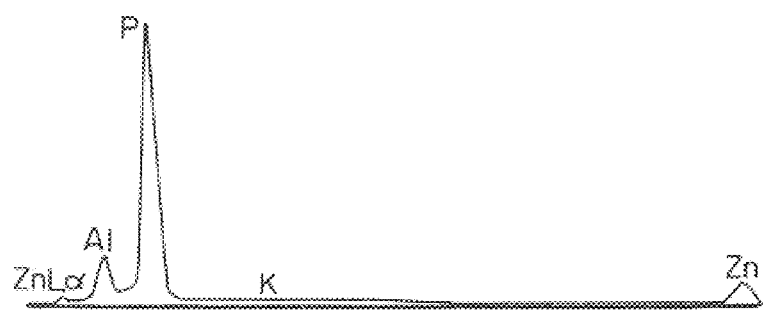
Figure 2B:
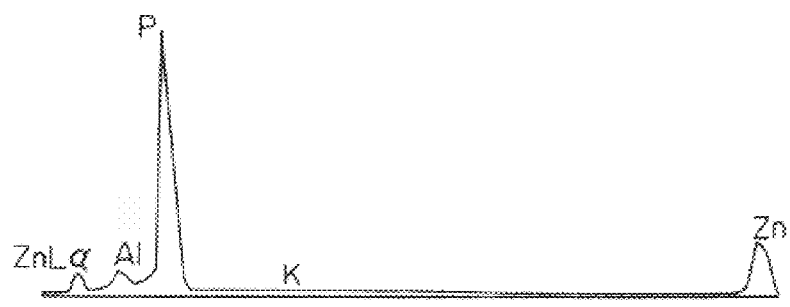

With reference to FIG. 1a and FIG. 1b, the aluminum phosphate and zinc phosphate typically form a two-phase deposit in the carbon after heating. It is believed that the aluminum phosphate phase includes zinc phosphate in solid solution. It is also believed that the zinc phosphate phase includes aluminum phosphate in solid solution. FIGS. 2a and 2b show the energy dispersive x-ray (EDX) spectra of dark and light portions, respectively, of the microstructures in FIGS. 1a and 1b. These data were obtained using a JEOL JSM-840 Scanning Microscope with a Tracor Northern Series II energy dispersive x-ray micranalyzer. An aluminum-rich phosphate (dark by secondary electron emission) is dispersed in a zinc-rich phosphate matrix (brighter secondary electron emission). Since aluminum phosphate has a higher melting point than zinc phosphate, this is evidence that solid particles exist within a fluid matrix at certain temperatures during the oxidation process, thus contributing an increased viscosity to inhibit coalescence of the particles that would degrade the dispersion at higher temperatures. Compositions containing this mixture of aluminum and zinc phosphates have superior ability to deactivate a potassium oxidation catalyst after heating to high temperatures.

The following examples relate to the aqueous compositions and methods of the present invention. Unless otherwise indicated, throughout the specification and claims, parts are parts by weight, temperatures are degrees Celsius, and pressure is atmospheric pressure.

EXAMPLE 1

An aqueous mixture is prepared by mixing 20 parts of 85% solution of phosphoric acid, 48 parts of a 50% solution of monoaluminum phosphate, 12% by weight of zinc phosphate dihydrate, and 20 parts water. The aqueous mixture is warmed to about 35° C. while being stirred for 30 minutes.

EXAMPLE 2

An aqueous mixture is prepared as described in Example 1 except 54 parts of the monoaluminum phosphate and 6 parts of the zinc phosphate are used.

EXAMPLE 3

An aqueous mixture is prepared as described in Example 1 except 1% by weight of an alkoxylated acetylenic polyol (SURFYNOL 440) is added to the mixture and dispersed by ultrasonic agitation for 30 minutes.

EXAMPLE 4

An aqueous mixture is prepared as described in Example 3 wherein an alkoxylated linear alcohol (POLY-TERGENT SL-62) is used in place of the alkoxylated tetramethyldecynediol and dispersed by ultrasonic agitation for 30 minutes.

EXAMPLE 5

An aqueous mixture is prepared as described in Example 1 except 0.25% by weight of the alkoxylated linear alcohol of Example 4 is added to the mixture.

EXAMPLE 6

An aqueous mixture is prepared as described in Example 1 except 0.5% by weight of the alkoxylated linear alcohol of Example 4 is added to the mixture.

Experimental

Coupons are cut from brake material, manufactured by densification of a fiber preform by chemical vapor infiltration/deposition of carbon (CVI-C) with an intermediate heat treatment prior to final CVI-C. Typically, 8% to 13% of the volume of the brake material consists of pores. The porosity is measured by displacement in a liquid, Isopar-M, under vacuum. In one embodiment, the carbon is further subjected to a final heat treatment at about 2200° C. which can improve the resistance to oxidation of the carbon.

Oxidation tests are conducted by comparing weight loss in a lot of coupons during exposures in flowing air in cooling cycles at temperatures between about 427° C. and 704° C. The times are shown below in Table 1. The time and temperature profiles simulate aircraft landings. Between cycles, coupon locations are shifted to compensate for temperature gradients within the furnace.

Coupons are placed on $Al_2O_3$ tube supports and inserted into the preheated furnace. After removal, weights are subtracted from the as-inhibited weight, obtained after heating 5–6 minutes at 593° C. in air, and divided by the uninhibited dry carbon weight to compare carbon weight loss after successive "landings". Following an initial oxidation to simulate initial service, contamination is simulated by soaking specimens for about 5 minutes in a contaminating solution containing an oxidation catalyst. In some tests, seawater containing 10.8 mg/l Na, 1.46 mg/l Mg, 0.43 mg/l K and 0.33 mg/l Ca (all oxidation catalysts) is used. In some tests, coupons are soaked instead in a diluted solution of runway deicer representing contamination on a runway containing a mixture of deicer and melted snow or ice. The diluted solution contains ten (10) percent by volume of commercial runway deicer E36. The runway deicer (E36) contains about 51% potassium acetate and is manufactured by Cryotech Deicing Technology. Samples for testing are supplied by Chevron Chemical Company. After contamination, the coupons are first dried and then are heated for 5 minutes at 593° C.; the weight increase (~0.1% of the carbon weight) is added to the previous weight from which later weights are subtracted to calculate percent carbon lost. Coupons are treated with the aqueous compositions and are exposed to oxidation as described above. In the following Tables, MZ-1A refers to the aqueous composition of Example 1 and MZ-1 refers to the aqueous composition of Example 4.

As a test of the effectiveness of the preferred composition and processing method against oxidation catalyzed by potassium in runway deicer, coupons are painted with or dipped in the aqueous compositions described above. The coupons are baked together in an oven heated to 649° C. for two hours. They are then preoxidized in cycles equivalent to 600 landings, and are contaminated by soaking for 5 minutes in solutions with increasing amounts of runway deicer E36 added to deionized water. In these tests, the "landings" after contamination are simulated by oxidation in flowing air in a furnace which is cooled from a maximum temperature at the temperatures and for times shown in Table 1. In Table 1 are described six succesive thermal thermal cycles, one per column, in which the samples are cooled from a maximum temperature in the times shown. Each successive thermal cycle represents higher temperatures because the carbon heat sink mass of a brake is reduced as that brake wears but the energy input of a simulated landing remains constant.

TABLE 1

Cooling Profiles For "Landings" Simulation Of Carbon Oxidation

| Temp, ° C. | | Time, Minutes, For Cooling At A Uniform Rate In "Landings" | | | | | |
|---|---|---|---|---|---|---|---|
| From | To | 1–600 | 601–800 | 801–1000 | 1001–1200 | 1201–1400 | 1401–1600 |
| 704 | 677 | — | — | — | 6 | 8 | 4 |
| 677 | 649 | — | 6 | 10 | 7 | 6 | 6 |
| 649 | 621 | 15 | 7 | 7 | 7 | 7 | 7 |
| 621 | 593 | 24 | 7 | 7 | 8 | 8 | 30 |
| 593 | 566 | 22 | 8 | 8 | 8 | 36 | 66 |
| 566 | 538 | 27 | 12 | 20 | 51 | 71 | 77 |
| 538 | 510 | 33 | 24 | 54 | 76 | 100 | 140 |
| 510 | 482 | 56 | 108 | 194 | 256 | 252 | 236 |
| 482 | 454 | 641 | 261 | 209 | 153 | 188 | 246 |
| 454 | 427 | 553 | 182 | 235 | 352 | 414 | 500 |

Table 2 contains data on the effectiveness of oxidation inhibiting solutions containing a mixture of a zinc salt and an aluminum salt when a preferred wetting agent is added. In this table, coupons 1–5 demonstrate the reproducibility of the method when 1% of Olin Chemical POLY-TERGENT SL-62 is added. Coupon's 6–10 without the wetting agent show a variability in performance resulting from relatively large (millimeter size) regions which are left without phosphate deposits after the bake. Four additional coupons demonstrate effectiveness with 0.25% and 0.5% of the wetting agent with either 649° C. or 760° C. baking temperatures.

TABLE 2

Percent Change in Initial Carbon Weight After Drying at 300° C.

| | Inhib. & Bake at 843° C. | 0–600L | E36 & Bake at 321° C. | 601–800L | 801–1000L | 1001–1200L | 1201–1400L | E36 & Bake at 321° C. | 1401–1600L |
|---|---|---|---|---|---|---|---|---|---|
| | +MZ-1 | | | | | | | | |
| 1 | +2.83 | −0.02 | +0.12 | −0.07 | −0.09 | −0.11 | −0.16 | +0.14 | −0.47 |
| 2 | +2.20 | −0.02 | +0.12 | −0.07 | −0.09 | −0.12 | −0.17 | +0.13 | −0.55 |
| 3 | +2.50 | −0.02 | +0.13 | −0.07 | −0.09 | −0.12 | −0.18 | +0.13 | −0.57 |
| 4 | +2.64 | −0.02 | +0.14 | −0.08 | −0.11 | −0.16 | −0.22 | +0.15 | −0.65 |
| 5 | +2.74 | −0.02 | +0.13 | −0.07 | −0.09 | −0.13 | −0.19 | +0.20 | −0.98 |
| | +MZ-1A | | | | | | | | |
| 6 | +3.13 | −0.01 | +0.12 | −0.12 | −0.16 | −0.22 | −0.24 | +0.12 | −0.86 |
| 7 | +2.46 | −0.01 | +0.12 | −0.26 | −0.39 | −0.54 | −0.67 | +0.13 | −3.00 |
| 8 | +1.48 | −0.01 | +0.16 | −1.09 | −1.61 | −2.15 | −2.63 | +0.22 | −11.19 |
| 9 | +2.03 | −0.01 | +0.17 | −1.78 | −2.93 | −3.82 | −4.64 | — | −6.42 |
| 10 | +1.89 | −0.01 | +0.15 | −5.01 | −7.97 | −9.41 | −10.85 | — | — |

| Inhib. System | Bake Temp. (° C.) | Inhib. & Bake at 321° C. | 0–600L | Cat.[3] + Bake at 299° C. | 601–800L | 801–1000L | 1001–1200L | 1201–1400L | Cat.[3] + Bake at 321° C. | 1401–1600L |
|---|---|---|---|---|---|---|---|---|---|---|
| MZ-1[1] | 649 | +1.61 | −0.04 | +0.22 | −0.20 | −0.21 | −0.22 | −0.23 | +0.15 | −0.32 |
| | 760 | +1.95 | −0.05 | +0.25 | −0.22 | −0.23 | −0.24 | −0.25 | +0.13 | −0.30 |
| MZ-1[2] | 649 | +1.87 | −0.03 | +0.24 | −0.20 | −0.21 | −0.22 | −0.23 | +0.15 | −0.32 |
| | 760 | +1.74 | −0.02 | +0.27 | −0.21 | −0.22 | −0.22 | −0.23 | +0.15 | −0.31 |

[1]0.50% POLY-TERGENT SL-62
[2]0.25% POLY-TERGENT Sl-62
[3]Cat. = 5% solution of Potassium Acetate in water, equivalent to 10% E36 deicer Other tests are representative of applications where the carbon brakes are exposed to a combination of higher temperatures and periodic exposure to oxidation catalysts in seawater or runway deicers. In such applications, a barrier coating is required to limit access of oxygen to the carbon at high temperatures, where the rate of carbon oxidation is high whether or not catalysts are present. The barrier coating may be applied by a baked SiC paint, SiC deposited by chemical vapor deposition, or a combination of these methods on different portions of the brake discs.

Coupons are cut from brake material manufactured by densification of a fiber preform by chemical vapor infiltration/deposition of carbon (CVI-C). Some of the coupons are first preoxidized to increase surface porosity by soaking in 85% $H_3PO_4$ and then baking to 843° C. for 2 hours, thus removing catalytic impurities, and then oxidizing the coupons in air for either 2 or 4 hours in a furnace set at 621° C. The purpose of such preoxidation is to open surface cracks and surface pores to improve adherence of the barrier coatings. Some of the coupons, with or without preoxidation, are painted with a commercial SiC paint manufactured by ZYP Coatings, Inc., Oak Ridge, Tenn., and baked at 760° C. Others are coated by chemical vapor deposition of SiC at 927° C. for 49 hours. The coupons are then soaked for 5 minutes in an aqueous inhibiting composition which does not contain a wetting agent and baked for 2 hours at either 760° C. or 843° C. The purpose of omitting the wetting agent in this case is to permit the inhibiting composition to concentrate in the pores and cracks of the surface coating during the bake.

Oxidation tests are conducted by comparing weight loss in coupons during isothermal exposures to flowing air. The times and temperatures of the tests are shown in Table 3. The time and temperature profiles simulate a sequence of aircraft landings which absorb different amounts of kinetic energy, and are based on measurements of thermocouples inside the rotors and stators of brakes during dynamometer tests in which these different levels of kinetic energy are absorbed.

TABLE 3

| Service Landing | |
|---|---|
| 1) | 593° C. to 566° C. in 1 minute |
| 2) | 566° C. to 496° C. in 12.5 minutes |
| 3) | 496° C. to 427° C. in 5 minutes |

TABLE 3-continued

| Normal Landing | |
|---|---|
| 1) | 871° C. to 760° C. in 30 seconds |
| 2) | 760° C. to 643° C. in 4 minutes |
| 3) | 704° C. to 593° C. in 5 minutes |
| 4) | 677° C. to 566° C. in 4 minutes |
| 5) | 566° C. to 427° C. in 10 minutes |
| Lightweight Landing | |
| 1) | 496° C. to 427° C. in 5 minutes |

In the following examples, the treated coupons are exposed to specific combinations of the above "landings" together with exposure to seawater. The treated coupons are initially soaked in Pacific Ocean water for three hours at room temperature and then dried at 320° C. to obtain the weight of sea salt added. The testing occurs in sequences of successive cooling cycles based on multiples of the above type landing temperature and time profiles. In the sequences S stands for service landing, N stands for normal landings, and L stands for lightweight landings. Below W stands for a fifteen minute soak in sea water. 12 W represents a three hour soak in sea water.

Sequence A–C
12W+51S+5N+W+101S+60L+W+10N+W+100S+40L+W+10N.

Sequence G
Sequence A–C+50S+10N+12W+101S+60L+5N+40S+11N+W+5+40L+5N.

The following Table 4 contains data showing the percentage of change in weight of the original carbon in coupons which have a silicon carbide coating, having a thickness of 1 to 2 mils, and which are treated with an inhibitor composition. The data also show the effect of preoxidation of the coupon as described above.

In the below Table 4, Examples 1–11 relate to chemical vapor deposition SiC coatings. Examples 12–17 relate to painted SiC coatings. The SiC coating of Examples 1–6 was prepared by depositing the SiC on the carbon-carbon deposit for 49 hours at 927° C. Examples 7–10 were coated with SiC by CVD under similar conditions in other furnace runs for 50 hours. Example 11 had a thinner deposit as a result of only 22½ hours of CVD. Examples 1–3, and 7–14 were baked at 843° C. for 2 hours after treatment with the aqueous composition. Examples 4–6 and 15–17 were baked at 760° C. for 2 hours after treatment with the aqueous composition.

TABLE 4

Percent Change In Initial Carbon Weight

| | Preox. & Loss | Paint or SiC CVD | Inhibiter and Bake Temp. (° C.) | | Coating Added | Inhib. Added | 3 hour Seawater +610° F. | Sequence A-C 377 Ldgs | Sequence G 749 Ldgs |
|---|---|---|---|---|---|---|---|---|---|
| 1 | None | CVD | MZ-1A | 843 | +9.39 | +1.02 | +0.03 | −0.27 | −3.15 |
| 2 | −0.58 | CVD | MZ-1A | 843 | +11.47 | +1.41 | +0.05 | −0.23 | −0.28 |
| 3 | −1.70 | CVD | MZ-1A | 843 | +11.28 | +1.41 | +0.11 | −0.26 | −0.31 |
| 4 | None | CVD | MZ-1A | 760 | +10.63 | +0.98 | +0.02 | −0.20 | −0.85 |
| 5 | −0.65 | CVD | MZ-1A | 760 | +10.85 | +1.30 | +0.05 | −0.20 | −0.26 |
| 6 | −1.96 | CVD | MZ-1A | 760 | +11.03 | +1.65 | +0.08 | −0.27 | −0.34 |
| 7 | None | CVD | MZ-1A | 843 | +9.80 | +1.45 | +0.06 | −0.23 | −0.27 |
| 8 | None | CVD | MZ-1 | 843 | +7.52 | +0.97 | +0.04 | −0.17 | −0.43 |
| 9 | None | CVD | MZ-1* | 843 | +10.35 | +1.13 | +0.04 | −0.19 | −1.15 |
| 10 | None | CVD | MZ-1* | 843 | +7.65 | +1.29 | +0.03 | −0.83 | −8.81 |
| 11 | None | CVD thin | MZ-1A | 843 | +5.56 | +1.94 | −0.14 | −0.47 | −15.53 |
| 12 | None | Paint | MZ-1A | 843 | +2.36 | +3.31 | −0.03 | −0.68 | −6.34 |

TABLE 4-continued

| | | | Percent Change In Initial Carbon Weight | | | | | |
|---|---|---|---|---|---|---|---|---|
| | Preox. & Loss | Paint or SiC CVD | Inhibiter and Bake Temp. (° C.) | | Coating Added | Inhib. Added | 3 hour Seawater +610° F. | Sequence A-C 377 Ldgs | Sequence G 749 Ldgs |
| 13 | −0.54 | Paint | MZ-1A | 843 | +2.26 | +3.01 | +0.07 | −0.58 | −2.23 |
| 14 | −1.98 | Paint | MZ-1A | 843 | +2.94 | +3.35 | +0.05 | −0.66 | −1.35 |
| 15 | None | Paint | MZ-1A | 760 | +2.07 | +1.35 | −0.07 | −43.1 | — |
| 16 | −0.63 | Paint | MZ-1A | 760 | +2.60 | +2.29 | −0.13 | −1.09 | −9.86 |
| 17 | −1.81 | Paint | MZ-1A | 760 | +2.59 | +3.63 | −0.23 | −0.65 | −1.36 |

As can be see from the above data, coupons with a SiC coating applied by either paint or CVD and which are treated with the oxidation inhibiting composition have resistance to the combination of high temperatures and catalysis from seawater. In some cases, examples 11 and 15, SiC coating failure resulted when the application was too thin or was not sufficiently adherent. Improvement of adherence and retention of the inhibitor concentration added was obtained by increasing surface porosity by preoxidation in examples 2, 3, 5, 6, 13, 14, 16 and 17.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A method of inhibiting catalyzed oxidation of carbon-carbon composites comprising the steps of treating a carbon-carbon composite having pores with a liquid composition comprising (a) phosphoric acid, (b) a zinc salt, and (c) an aluminum salt, wherein the liquid composition contains less than about 0.1% by weight boron, and heating the treated carbon-carbon composite to a temperature sufficient to form a deposit within the pores.

2. The method of claim 1 wherein the liquid composition is an aqueous solution.

3. The method of claim 1 wherein the treated carbon-carbon composite is heated to a temperature from about 640° C. up to about 900° C.

4. The method of claim 1 wherein the deposit comprises a dispersion of aluminum-rich phosphate in zinc-rich phosphate.

5. The method of claim 1 wherein the zinc salt (b) is selected from the group consisting of a zinc halide, a zinc nitrate, a zinc phosphate, and a mixture thereof, and wherein the aluminum salt (c) is selected from the group consisting of an aluminum halide, an aluminum nitrate, an aluminum phosphate, and a mixture thereof.

6. The method of claim 1 wherein the aluminum salt is monoaluminum phosphate and the zinc salt is zinc phosphate.

7. The method of claim 1 wherein the liquid composition further comprises (d) a compatible wetting agent.

8. The method of claim 7 wherein the compatible wetting agent (d) is selected from the group consisting of a polyol, an alkoxylated monohydric alcohol, and a mixture thereof.

9. The method of claim 7 wherein (d) is an acetylenic polyol or an alkoxylated acetylenic polyol.

10. The method of claim 7 wherein (d) is an alkoxylated monohydric alcohol prepared by reacting a monohydric alcohol having about 8 to about 24 carbon atoms with an epoxide.

11. The method of claim 1, wherein the barrier coating is applied by chemical vapor deposition of a coating which forms microcracks upon cooling.

12. A method of inhibiting catalyzed oxidation of carbon-carbon composites comprising the steps of treating a carbon-carbon composite having pores with a liquid composition capable of impregnating carbon-carbon composites comprising (a) phosphoric acid, (b) a zinc salt, (c) an aluminum salt and (d) a compatible wetting agent, and heating the treated carbon-carbon composite to a temperature sufficient to form a deposit throughout the pores.

13. The method of claim 12 wherein the wetting agent (d) is selected from the group consisting of polyol, an alkoxylated monohydric alcohol, and mixtures thereof.

14. The method of claim 12 wherein the deposit comprises a dispersion of aluminum-rich phosphate in zinc-rich phosphate.

15. The method of claim 12 wherein the carbon-carbon composite has a silicon carbide barrier coating.

16. An article produced by the method of claim 1.

17. The article of claim 16, wherein the article is a friction disc.

18. The method of claim 17, wherein the liquid composition further comprises a compatible wetting agent.

19. The method of claim 18 wherein the liquid composition further comprises a compatible wetting agent.

20. The method of claim 1 wherein the liquid composition is free of boron.

21. The method of claim 1 wherein the carbon-carbon composite is covered with a barrier coating the barrier coating being formed by applying a silicon carbide coating by chemical vapor deposition and wherein the coating forms microcracks upon cooling.

* * * * *